(12) United States Patent
Götz

(10) Patent No.: US 7,137,470 B2
(45) Date of Patent: Nov. 21, 2006

(54) DRIVE DEVICE FOR AN INDUSTRIAL TRUCK

(75) Inventor: Bernhard Götz, Aschaffenburg (DE)

(73) Assignee: Linde Aktiengesellschaft, Wiesbaden (DE)

(*) Notice: Subject to any disclaimer, the term of this patent is extended or adjusted under 35 U.S.C. 154(b) by 4 days.

(21) Appl. No.: 10/890,826

(22) Filed: Jul. 14, 2004

(65) Prior Publication Data

US 2005/0034912 A1 Feb. 17, 2005

(30) Foreign Application Priority Data

Jul. 15, 2003 (DE) .................. 103 31 919
Mar. 26, 2004 (DE) .................. 10 2004 014 773

(51) Int. Cl.
*B60K 17/30* (2006.01)
*B60K 17/356* (2006.01)
*B60K 17/36* (2006.01)

(52) U.S. Cl. .................. 180/264; 280/267; 280/265
(58) Field of Classification Search ............. 280/264, 280/265, 267; 180/264
See application file for complete search history.

(56) References Cited

U.S. PATENT DOCUMENTS 1,619,616 A * 3/1927 Ionides .................. 180/264
3,280,931 A * 10/1966 Cahill et al. .............. 180/23
3,645,406 A * 2/1972 Brazell .................. 212/344
5,379,842 A * 1/1995 Terry .................... 180/21
5,735,416 A * 4/1998 Jussila ................... 212/344
5,967,348 A * 10/1999 Jussila ................... 212/344

FOREIGN PATENT DOCUMENTS

DE 199 54 590 A1 5/2001

OTHER PUBLICATIONS www.electricmotorwarehouse.com/three_phase_0PDP1-15hp.htm.*

* cited by examiner

*Primary Examiner*—Lesley D. Morris
*Assistant Examiner*—Marlon Arce-Diaz
(74) *Attorney, Agent, or Firm*—The Webb Law Firm

(57) ABSTRACT

A drive device for an industrial truck includes a pivoted bolster rotatable around a vertical axis (V), two drive wheels (4, 5) mounted on the pivoted bolster and a device located axially between the drive wheels (4, 5) to generate a differential action between the drive wheels (4, 5). A vertically oriented motor (6) can be provided above the drive wheels (4, 5) and a mechanical differential (7) can be coupled with the motor (6) and the drive wheels (4, 5). Alternatively, each drive wheel (4 or 5) can be coupled with its own motor (8 or 9). Alternatively still, a double rotor electric motor (10) having two rotors (10c, 10d) and a common stator (10b) can be located between the drive wheels (4 or 5) and coupled with a neighboring drive wheel (4 or 5).

10 Claims, 2 Drawing Sheets

DRIVE DEVICE FOR AN INDUSTRIAL TRUCK

CROSS REFERENCE TO RELATED APPLICATIONS

This application claims priority to German Application No. 103 31 919.0 filed Jul. 15, 2003 and German Application No. 10 2004 014 773.6 filed Mar. 26, 2004, both of which applications are herein incorporated by reference in their entirety.

BACKGROUND OF THE INVENTION

1. Field of the Invention

This invention relates to a drive device for an industrial truck, the drive device having a pivoted bolster that can rotate around a vertical axis, two drive wheels that are mounted on the pivoted bolster parallel and in mirror symmetry with respect to the vertical axis, and a device that is located between the drive wheels to generate a differential action between the drive wheels.

2. Technical Considerations

Drive devices with a pivoted bolster are used, for example, in industrial materials handling equipment. In such equipment, there is generally a single drive wheel. This type of construction has the disadvantage that high wear occurs to the wheels, particularly when the wheels are steered while the vehicle is stopped. Moreover, the steering forces that an operator must apply by means of a towbar are high.

DE 199 54 590 A1 describes a generic drive device that does not suffer from this disadvantage because it has two parallel drive wheels. In that case, the two drive wheels are coupled with a common electric motor that is located in the wheel hubs, into which a differential is integrated. Also installed in the wheel hubs are two reduction gearsets, each of which is connected to one of the outputs of the differential. As a result of the small amount of space available, this known configuration requires a very tightly packed and therefore complicated arrangement of the individual components of the drive device.

Therefore, it is an object of the invention to provide a drive device of the general type described above but that has a simplified construction.

SUMMARY OF THE INVENTION

In a first realization of the invention, a vertically oriented motor is provided above the drive wheels. The device used to generate a differential action is a mechanical differential, the input of which is coupled with the motor and the two outputs of which are effectively connected with the drive wheels.

In a drive device of the invention, more space is available for both the mechanical differential and for the motor than in the drive device of the known art. The construction is thereby simplified.

In one advantageous configuration of the invention, the motor is oriented coaxially with the vertical axis of the pivoted bolster.

If a reducing gearset is located between the respective output of the differential and the corresponding drive wheel, a small electric motor with a high output speed can be used. There is sufficient space for the reducing gearsets between the drive wheels because the common motor is installed elsewhere.

Each of the reducing gearsets can be advantageously located at least partly inside a rim of the corresponding drive wheel. The distance between the drive wheels can thereby be minimized.

With regard to a simple construction of the drive device of the invention, it is also advantageous if the pivoted bolster has a horizontal flange on which the motor is fastened. The flange can be in contact with a frame, with the interposition of a pivot bearing.

In a second exemplary realization of the invention, each drive wheel can be coupled with its own motor, for example in the form of a wheel hub motor.

When electric motors are used, the differential effect between the two drive wheels can be generated electrically ("electric differential"). Therefore, a mechanical differential may no longer be necessary. In this case, it is also advantageous if an integrated reducing gearset is located downstream of each motor. A brake can also be integrated in each motor.

In the configurations of the invention described above, the motor can be realized in the form of an electric motor, such as a three-phase motor.

In a third exemplary embodiment of the invention, a double rotor electric motor can be located between the wheels. The motor can have two rotors and a common stator, whereby each of the rotors can be directly or indirectly coupled with a neighboring drive wheel.

Because the drive wheels can be located relatively close to each other, there are only slight speed differences when the vehicle travels around a curve. Therefore, it is sufficient to provide only one control system and one power electronics unit for the double rotor motor. The differential action between the two drive wheels is thereby achieved by the different slip between the rotors and the stator.

In one configuration of the invention, the double rotor motor is a radial field motor. It is also possible, however, for the motor to be an axial field motor. To minimize the service and maintenance required, brushless motors, e.g., with three-phase current technology, can be used.

BRIEF DESCRIPTION OF THE DRAWINGS

Additional advantages and details are explained in greater detail below with reference to the exemplary embodiments illustrated in the accompanying schematic figures, in which like reference symbols identify like parts throughout.

DESCRIPTION OF THE PREFERRED EMBODIMENTS

Figure 1:
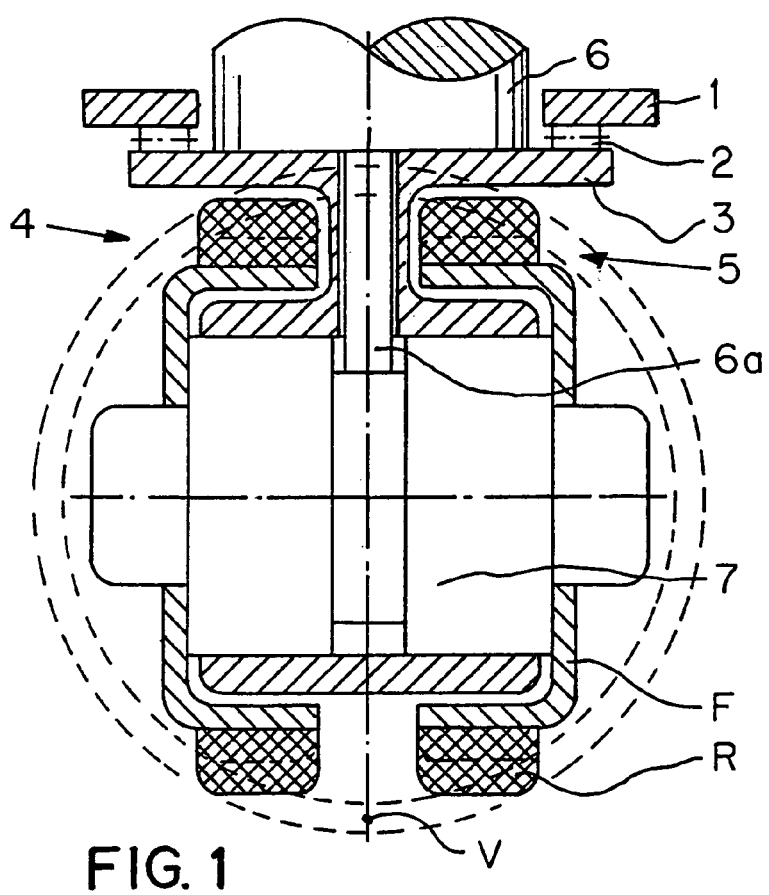
FIG. 1 shows a first embodiment of a drive device of the invention.

As used herein, spatial terms, such as "vertical", "horizontal", and the like, relate to the invention as it is shown in the drawing figures. However, it is to be understood that the invention can assume various other orientations and, therefore, these terms should not be considered as limiting.

In the embodiment illustrated in FIG. 1, a horizontal plate 3 of a pivoted bolster is supported on a frame 1 of an industrial truck, such as a low-lift truck, by means of a pivot bearing 2. The pivoted bolster can rotate around a vertical axis V. Fastened to the pivoted bolster, parallel to each other and in mirror symmetry with respect to the vertical axis V, are two drive wheels 4 and 5. The drive wheels 4 and 5 each have a tire R and a rim F.

The drive wheels 4 and 5 are driven by a motor 6, such as an electric motor, for example a three-phase electric motor, located above a mechanical differential 7 which is located axially between the wheels 4 and 5. The motor 6 is thereby fastened to the horizontal plate 3 coaxially with the vertical axis V.

The motor 6 and the input to the differential 7 located between the drive wheels 4 and 5 are connected by means of a motor shaft 6*a*. Downstream of each of the two outputs of the differential 7 are respective reducing gearsets, which are not shown in the figure.

Figure 2:
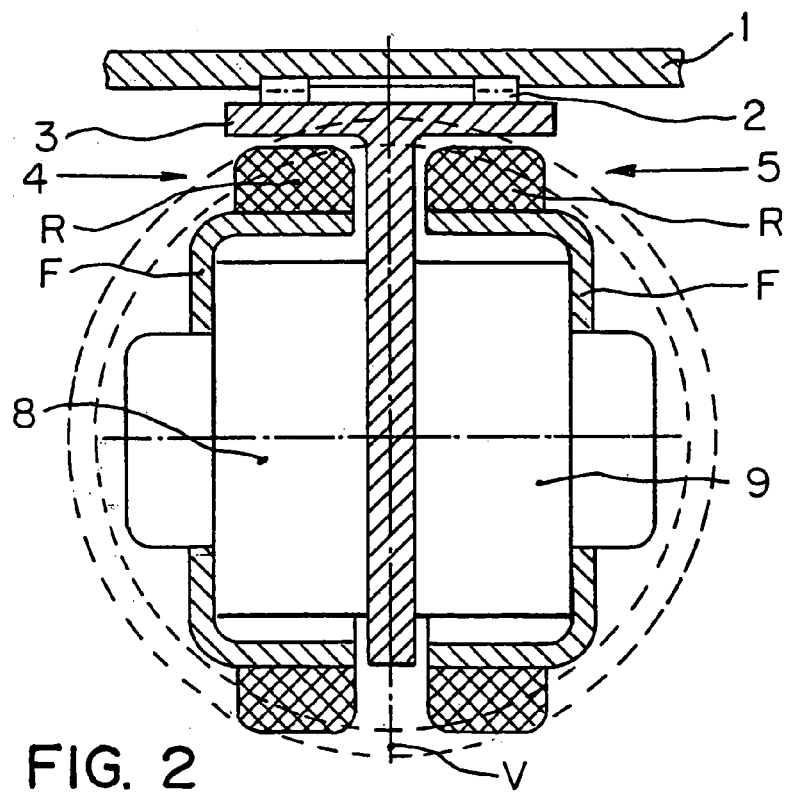
FIG. 2 shows a second embodiment of a drive device of the invention.

In the exemplary embodiment illustrated in FIG. 2, instead of a common motor and downstream differential, there are two (electric) motors 8 and 9 that are independent of each other. The motors 8 and 9 can be wheel hub motors and can be located inside the rims F of the respective drive wheels 4 and 5. The result is an electric differential.

Here, too, a reducing gearset can be advantageously located upstream of each drive wheel 4 and 5 (e.g., integrated into the motors 8, 9), so that the motors 8, 9 can be very small. In this exemplary embodiment, the drive device has a very low overall height.

Figure 3:
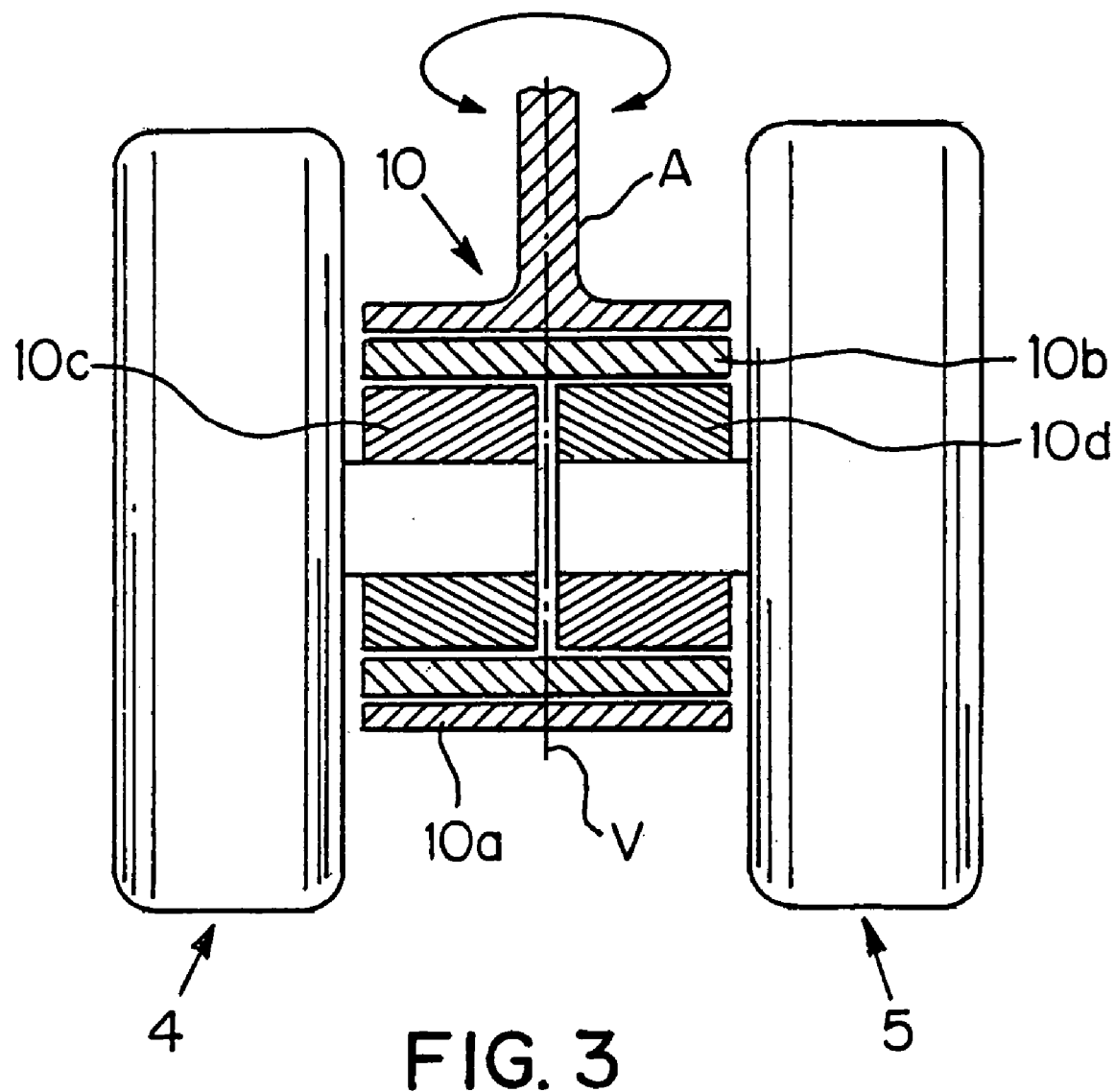
FIG. 3 shows a third embodiment of a drive device of the invention.

In the exemplary embodiment illustrated in FIG. 3, located axially between the two drive wheels 4 and 5, and preferably axially aligned with them, is an electric double rotor motor 10. The double rotor motor 10 can be fastened to an axle body A and has a stator 10*b* in a housing 10*a* and two rotors 10*c*, 10*d* mounted independently of each other. Each rotor 10*c* and 10*d* can be coupled with the respective neighboring drive wheel 4 or 5, for example with the interposition of a reducing gearset. Each drive wheel 4, 5 can also be provided with a brake (not shown in the figure).

The double rotor motor 10, as illustrated in this exemplary embodiment, can also be realized in the form of a radial field motor or in the form of an axial field motor, which in each case can be brushless. It is also possible to install a reducing gearset and/or a brake downstream of each rotor.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A drive device for an industrial truck, comprising:
   a pivoted bolster rotatable around a vertical axis;
   two drive wheels mounted on the pivoted bolster parallel and in mirror symmetry with respect to the vertical axis;
   a device located axially between the drive wheels to generate a differential action between the drive wheels; and
   a vertically oriented motor located above the drive wheels and having a motor shaft,
   wherein the device to generate a differential action is a mechanical differential having an input and two outputs, wherein the input of the mechanical differential is coupled with the motor shaft such that rotation of the motor shaft causes rotation of the two differential outputs, and wherein the two outputs of the mechanical differential are effectively connected with the drive wheels such that rotation of the two outputs rotates the drive wheels to drive the industrial truck.

2. A drive device for an industrial truck, comprising:
   a pivoted bolster rotatable around a vertical axis;
   two drive wheels mounted on the pivoted bolster parallel and in mirror symmetry with respect to the vertical axis;
   a device located axially between the drive wheels to generate a differential action between the drive wheels; and
   a vertically oriented motor located above the drive wheels,
   wherein the device to generate a differential action is a mechanical differential having an input and two outputs, wherein the input of the mechanical differential is coupled with the motor, and wherein the two outputs of the mechanical differential are effectively connected with the drive wheels, wherein the motor is oriented coaxially with the vertical axis of the pivoted bolster.

3. The drive device as claimed in claim 2, including a reducing gearset located between each output of the differential and a corresponding drive wheel.

4. The drive device as claimed in claim 3, wherein the reducing gearset is located at least partly inside a rim of the corresponding drive wheel.

5. A drive device for an industrial truck, comprising:
   a pivoted bolster rotatable around a vertical axis;
   two drive wheels mounted on the pivoted bolster parallel and in mirror symmetry with respect to the vertical axis;
   a device located axially between the drive wheels to generate a differential action between the drive wheels; and
   a vertically oriented motor located above the drive wheels,
   wherein the device to generate a differential action is a mechanical differential having an input and two outputs, wherein the input of the mechanical differential is coupled with the motor, and wherein the two outputs of the mechanical differential are effectively connected with the drive wheels, wherein the pivoted bolster includes a horizontal flange on which the motor is fastened, and which is in contact against a frame with the interposition of a pivot bearing.

6. The drive device as claimed in claim 2, wherein the pivoted bolster includes a horizontal flange on which the motor is fastened, and which is in contact against a frame with the interposition of a pivot bearing.

7. The drive device as claimed in claim 3, wherein the pivoted bolster includes a horizontal flange on which the motor is fastened, and which is in contact against a frame with the interposition of a pivot bearing.

8. The drive device as claimed in claim 4, wherein the pivoted bolster includes a horizontal flange on which the motor is fastened, and which is in contact against a frame with the interposition of a pivot bearing.

9. The drive device as claimed in claim 1, wherein the motor is an electric motor.

10. The drive device as claimed in claim 9, wherein the motor is a three-phase motor.

* * * * *